United States Patent [19]
Taylor

[11] Patent Number: 5,927,341
[45] Date of Patent: Jul. 27, 1999

[54] LINING OF "TEES" AND "WYES" IN PIPELINES OR PASSAGEWAYS

[75] Inventor: Kevan Charles Taylor, Memphis, Tenn.

[73] Assignee: Insituform (Netherlands) B.V., Netherlands

[21] Appl. No.: 08/604,975

[22] PCT Filed: May 9, 1994

[86] PCT No.: PCT/GB94/00995

§ 371 Date: Mar. 25, 1996

§ 102(e) Date: Mar. 25, 1996

[87] PCT Pub. No.: WO95/08737

PCT Pub. Date: Mar. 30, 1995

[30] Foreign Application Priority Data

Sep. 25, 1993 [GB] United Kingdom ............... 9319832

[51] Int. Cl.[6] ............... F16L 55/16; B29C 63/36
[52] U.S. Cl. ............... 138/98; 138/97; 264/269; 264/516; 156/287
[58] Field of Search .......... 138/98, 97; 264/269, 264/267, 516; 156/94, 287, 294, 574

[56] References Cited

U.S. PATENT DOCUMENTS

| | | | |
|---|---|---|---|
| 4,009,063 | 2/1977 | Wood | 156/71 |
| 4,135,958 | 1/1979 | Wood | 156/199 |
| 4,439,469 | 3/1984 | Wood | 427/230 |
| 4,581,247 | 4/1986 | Wood | 427/53.1 |
| 4,680,066 | 7/1987 | Wood | 156/156 |
| 4,991,006 | 2/1991 | Wood | 358/100 |
| 5,167,258 | 12/1992 | Rice | 138/98 |
| 5,199,463 | 4/1993 | Lippiatt | 138/98 |
| 5,329,063 | 7/1994 | Endoh | 138/98 |
| 5,340,160 | 8/1994 | Meijers et al. | 285/15 |
| 5,393,481 | 2/1995 | Wood | 264/516 |
| 5,439,033 | 8/1995 | Kamiyama et al. | 138/98 |
| 5,454,401 | 10/1995 | Kamiyama et al. | 138/98 |
| 5,566,719 | 10/1996 | Kamiyama et al. | 138/98 |
| 5,598,873 | 2/1997 | Kamiyama et al. | 138/98 |
| 5,624,629 | 4/1997 | Wood | 264/516 |
| 5,692,543 | 12/1997 | Wood | 138/98 |

FOREIGN PATENT DOCUMENTS

| | | |
|---|---|---|
| 3929558 | 3/1991 | Germany . |
| 4031949 | 4/1991 | Germany . |

OTHER PUBLICATIONS

PCT WO 91/07619 Meijers et al., Nov. 1990.

*Primary Examiner*—Patrick Brinson
*Attorney, Agent, or Firm*—Cowan, Liebowitz & Latman, P.C.; Michael I. Wolfson; Lloyd G. Buchanan

[57] ABSTRACT

The invention provides a tailored assembly of a flexible resin absorbent material (22, 24, 26). It is in the form of a "T" and is of tubular cross section. The arms of the T are intended to lie on the surface of a main underground pipe which the leg of the T extends into a lateral pipe which connects with the main pipe. The whole assembly is soaked in curable synthetic resin and it is placed in position and held there whilst resin cures by means of an inflatable bag (28) which is located inside the assembly and is also tailored to T configuration.

12 Claims, 3 Drawing Sheets

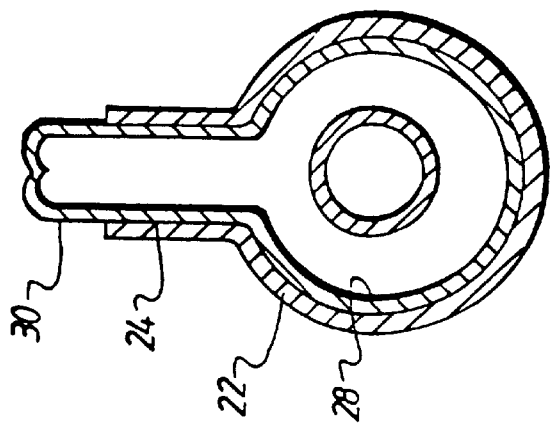
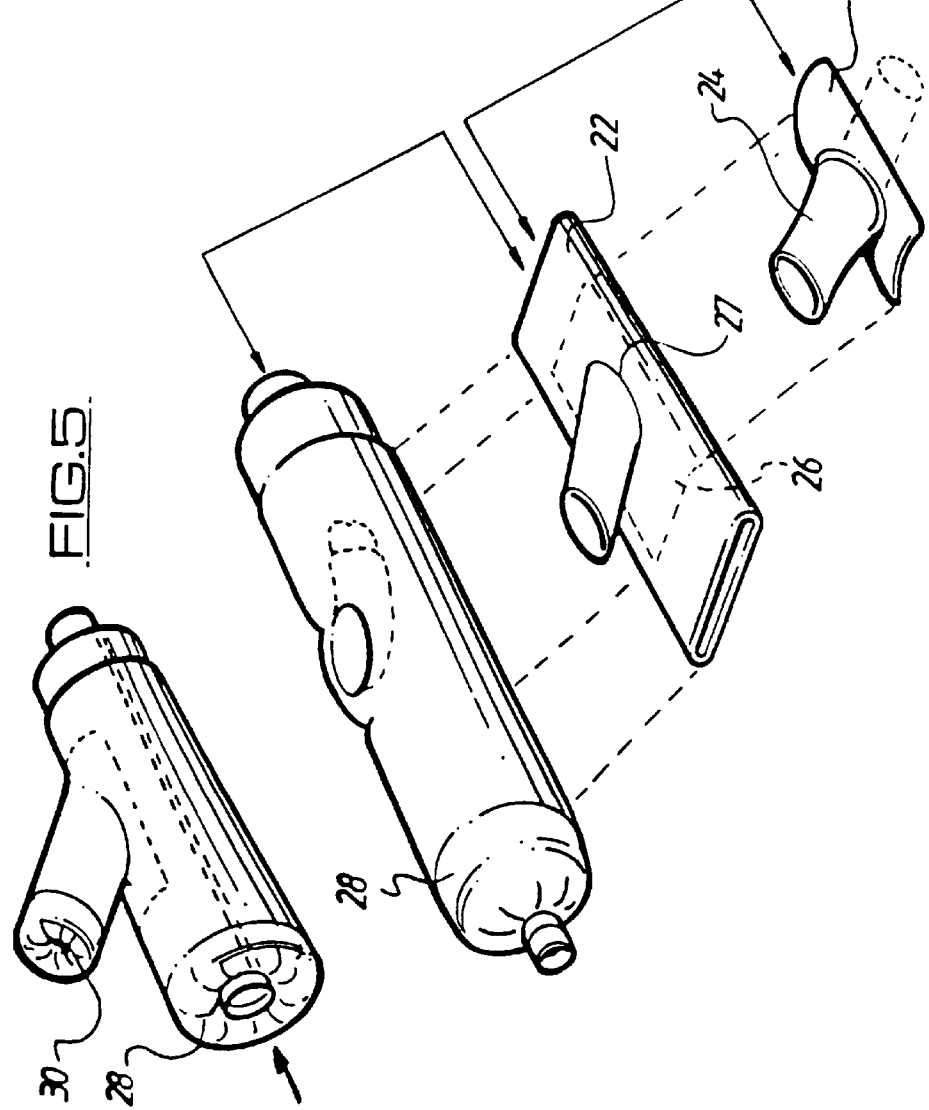

LINING OF "TEES" AND "WYES" IN PIPELINES OR PASSAGEWAYS

This invention relates to the lining of pipelines and passageways, using linings which have now become known as "cured in place" linings, which comprise tubular structures comprising or including at least one layer of resin absorbent material which is impregnated with a curable synthetic resin. The tubular structure while impregnated with resin and whilst the resin is uncured, is shaped to the surface which it is to line and held in that position by fluid pressure. Curing of the resin then takes place, or is caused to take place, so that the tubular structure will form a rigid layer which remains in place on the surface by virtue of its own rigidity and/or by virtue of bonding to the surface, but in any event an effective lining is provided.

Cured in place systems have been used very successfully for many years for the lining of underground pipelines and passageways, in particular sewer pipes, and examples of cured in place lining systems are disclosed in U.S. Pat. Nos. 4,009,063 and 4,064,211.

In these prior patents, it is envisaged that long lengths of main sewer lines will be lined, but in any main sewer line there are what are known as lateral connections which are the side or branch pipes which lead from the sewer to for example domestic consumption points. When a lining is applied along a main sewer as described in said US patents, the tubular structure will cover the lateral connections and these subsequently have to be reopened by the cutting away of coupons of the rigid lining in register with the lateral connections.

It is also been proposed to apply lining tubes in the said lateral passageways, but for a long time there has been a problem in providing an effective coupling arrangement in the region where the lateral passageway meets the main pipe. Indeed, in many cases it is the lateral/main pipe connection which causes the greatest problem in practice and often in a defective sewer pipe, it is only the lateral/main pipe connections which require to have a cured in place lining structure applied thereto.

When main line linings have been applied, and coupons are cut therefrom, difficulties often remain at the lateral/main pipe connections, and attempts have been made to cure these defects, but generally speaking the procedure is difficult and unsatisfactory.

The present invention seeks to provide a cured in place assembly for a lateral/main pipe connection whereby many of the difficulties at present existing will be overcome.

More particularly, the invention seeks to provide an assembly which can be positioned in the region of a lateral/main pipe connection and by a single operation results in the creation of a cured in place structure forming an effective lateral main pipe seal.

In accordance with the invention in a broadest aspect thereof an assembly for effecting a cured in place lining in the region of a lateral/main pipe connection, comprises a length of tubular structure for application to the main pipe surface to each side of a lateral connection, said length of main pipe tubular structure having a wall aperture for register with the lateral pipe, and a lateral extension tubular structure for extending into the lateral, said lateral tubular structure and main pipe tubular structure being of cured in place type in that each comprises at least one layer of a resin absorbent material which in use is impregnated with curable synthetic resin.

By providing this assembly, which is in effect a "tailored" unit to be urged into close contact in the region of the lateral/main pipe connection, a simple and effective means is provided for addressing the difficulty of forming a seal in the region of a lateral/main pipe connection.

To interconnect the extension tubular structure and a main pipe tubular structure, the main pipe tubular structure may be initially fabricated and provided with an aperture therein. The extension tubular structure may be provided at one end with a collar and the extension tubular structure is fed through the said aperture in the main pipe tubular structure so that the collar lies to the inside of the main pipe tubular structure. The said collar may be a rigid plastics material collar, or it may be a collar of resin absorbent materials similar to that of the extension tubular structure.

Additionally, it is preferred that there be provided a tailored inflation assembly for the purposes of inflating the main pipe tubular structure and the extension tubular structure simultaneous. The inflation assembly may be made of a robust inflatable material such as a reinforced silicone rubber bag which is defined to have a main inflation portion which will lie inside the main line tubular structure in use, and an inflatable arm portion which lies inside the extension tubular structure in use.

To assemble the bag assembly and the cured in place lining unit, the inflation assembly is deflated and the arm is pushed inwardly of the main bag so as to be inverted therein. The main bag in this condition is positioned inside the main tubular structure which by this time will have been impregnated with a curable resin, and the main bag and arm are inflated so that the arm everts through the extension tubular structure. The inflation assembly is then deflated again, and the arm is again inverted into the inside of the main bag, but this time the extension tubular structure is also inverted inside the inflatable arm. In this condition, the combined assembly and the lining carried thereby are introduced into the appropriate pipeline or passageway, with the inverted arm and extension tubular structure in register with the lateral pipe and then the bag assembly is reinflated which causes the main tubular structure to be inflated against the main pipe on opposite sides of the lateral, and the extension tubular structure to be everted into the lateral and against the lateral surface. This condition is maintained whilst the resin is caused or allowed to cure. When curing has been completed, and the lining assumes a rigid condition, the bag is again deflated and simply removed from the now remaining in place lining.

It is preferred that the resin should be of the ambient cure type which means that it will cure with the passage of time, which may be quite short, a matter of an hour or two, so that no external curing initiation means is required. It is of course possible to use resins which require cure initiation such as heat cure resins, light cure, ultrasonic and so on, but when other than ambient cure resin is utilised, extra means must be provided on site for initiating the cure which increases the cost of the process.

The inflation bag assembly may be designed to permit the flow of liquid along the main pipeline or passageway whilst the bag is inflated. To this end the inflation bag may be provided with a central core tube through which liquid can pass. The advantage of this is that when the bag is inflated inside the main pipe, the liquid which normally flows through the pipe, for example sewage, can continue to flow through the inflated bag assembly and there will be no requirement therefore to divert the flow whilst the operation is taking place.

An embodiment of the present invention will now be described, by way of example, with reference to the accompanying diagrammatic drawings, wherein:

FIG. 5 is a perspective view of the lining assembly when in the FIG. 3 condition;

FIG. 6 is an exploded perspective view illustrating the method of assembly of the lining; and FIG. 7 is a cross sectional view showing the lining in position in the pipeline or passageway.

Figure 1:
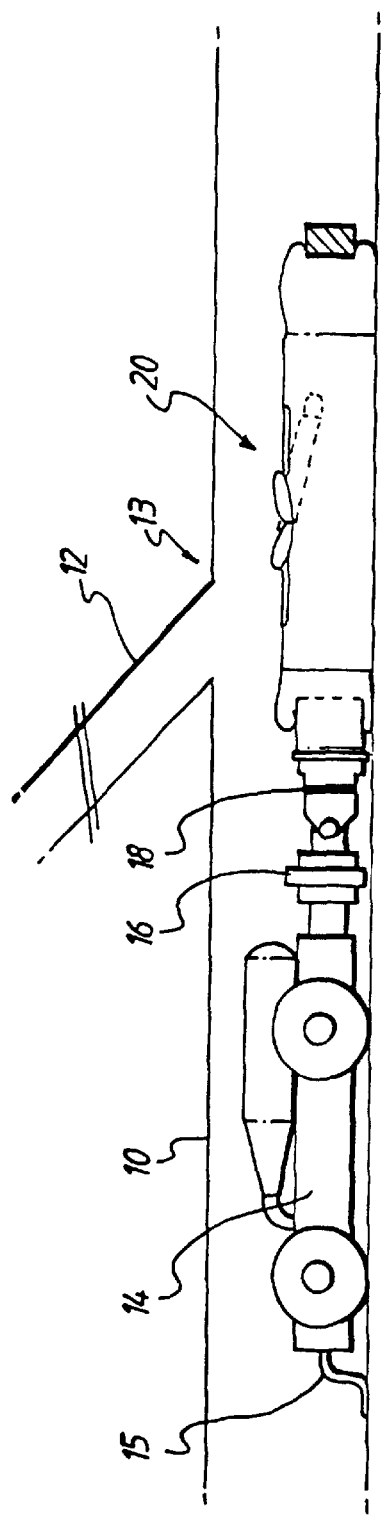
FIG. 1 shows a sectional elevation an underground sewer pipe with a lateral pipe connected thereto, and equipment for applying a lining in accordance with the invention.

Referring to the drawings, in FIG. 1 an underground main sewer pipe 10 is illustrated, and it is joined by a lateral pipe 12 at an angle as shown.

The requirement is that the region 13 of the lateral/main pipe connection is to be lined with a cured in place liner. In accordance with the embodiment of the invention the liner is flexible and resin absorbent and is fabricated and tailored to fit the region 13 so as to line a portion of the lateral where it joins the main pipe 10, and also to line the main pipe to opposite sides of the lateral.

In FIG. 1 an installation apparatus is illustrated and comprises a tractor 14 of any suitable configuration to which is connected an umbilical cord 15 which may include a television camera cable and air and water supplies as appropriate. In this example, the tractor is connected to a coupling 16 which is rotatable, and a clamping and release device 18 connects to the lining assembly 20. By movement of the tractor 14, controlled typically from ground level, the lining assembly 20 can be moved into position, and in this connection it can also be rotated by rotating the coupling 16 so that as required the lining assembly 20 is in correct register with the lateral pipe 12, a part of which is to be lined.

Figure 2:
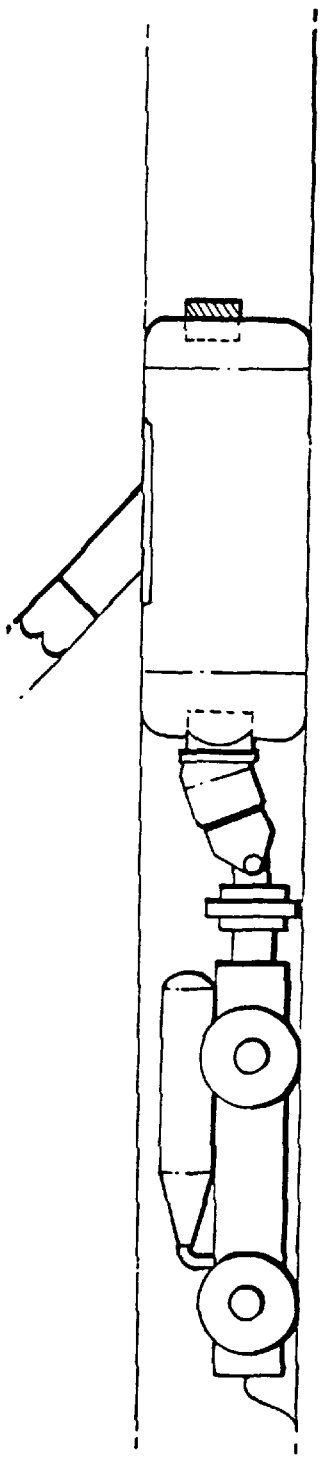
FIG. 2 shows the arrangement of FIG. 1 with the lining in position.

In the arrangement of FIG. 1, the lining assembly is shown deflated, but under the control of the operator at ground level, the assembly 20 can be inflated to the FIG. 2 position in which a portion of the main pipe to opposite sides of the lateral is lined with a cured in place tubular lining structure and an adjacent portion of the lateral 12 is also lined with an extension cured in place liner.

In this example the resin which is used is an ambient cure resin, and the condition shown in FIG. 2 is held until curing of the resin takes place. When curing has been completed sufficiently, the assembly 20 is deflated or more particularly an inflation bag thereof is deflated, and the bag can then simply be pulled clear of the rigid lining which is left in place.

Figure 3:
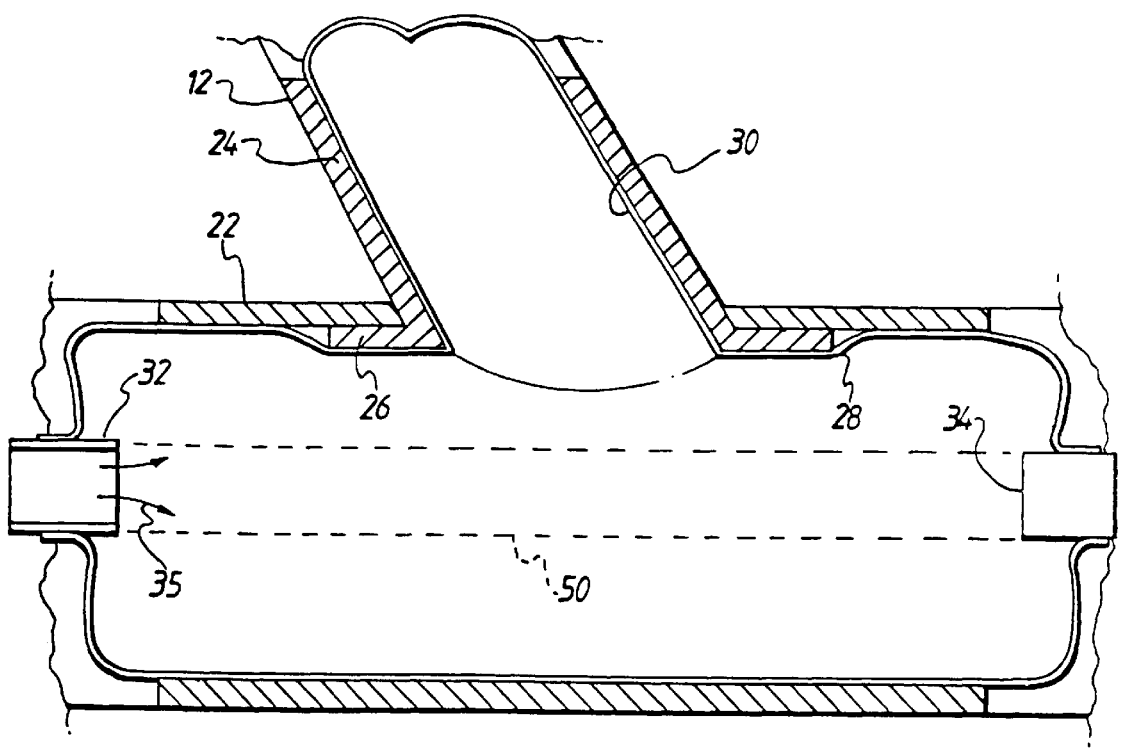
FIG. 3 is an enlarged view in cross sectional elevation showing the positioning of the lining when inflated as in FIG. 2.
Figure 4:
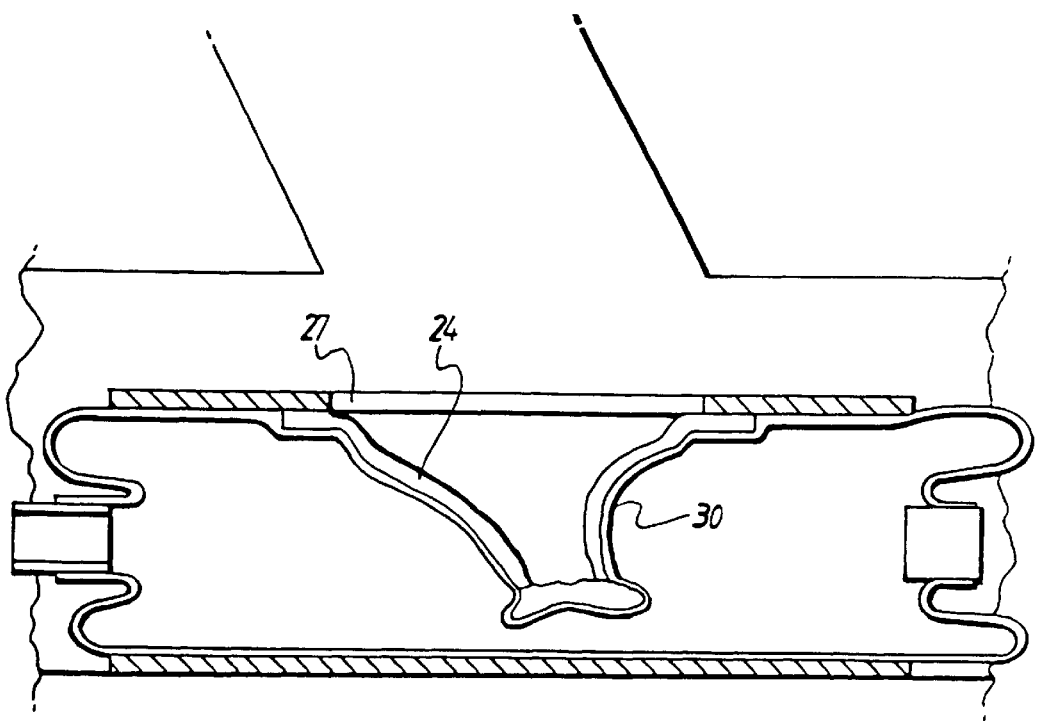
FIG. 4 is a view similar to FIG. 3, but showing the lining when deflated as in FIG. 1.

FIGS. 3 and 4 show the arrangement in more particular detail to facilitate understanding.

Referring to FIG. 3, the cured in place liner comprises a main pipe tubular structure 22 which comprises at least one layer of resin absorbent material impregnated with the curable synthetic resin, and an extension cured in place tubular structure 24 which lies on the lateral pipe 12. Extension tubular structure 24 is provided with an inner end collar 26 which is also impregnated with resin and which abuts the inner surface of the tubular structure 22 and may be connected thereto, so that the tubular portion 24 projects through an aperture 27 in the main tubular structure 22. The length of the extension 24 is selected depending upon the length of the lateral pipe 12 to be lined, but the main function of this lining assembly is to line the region (13) of the connection between the lateral pipe and the main pipe.

Inside the lining is an inflation bag 28 formed of suitable inflation material such as reinforced silicone rubber, and the bag has an arm 30 extending therefrom which performs the inflation of the extension tube 24 as will be understood.

At the ends of the main portion of the bag which inflates the main tubular structure 22, it has openings which are clamped around an infeed sleeve 32 in the case of the left-hand end, and a blocking plug 34 in the case of the right-hand end.

The sleeve 32 is utilised for the injection of air under pressure as indicated by arrows 35 whereby the bag 28 may be inflated to the condition shown.

FIG. 4 shows the arrangement wherein the bag and the lining applied thereto are in the deflated condition in which the assembly can be moved into position as shown in FIG. 1.

The extension tubular structure 24 is inverted along with the arm 30 of the bag so as to lie inwardly of the tubular structure 22. When the arrangement shown in FIG. 4 is inflated by introducing for example air under pressure, the assembly inflates to the condition shown in FIG. 3 and is held in this condition until curing is completed.

When the impregnated assembly 22, 24, 26 is transported along the main sewer pipe 10 it may be contained in a protective sleeve of plastics film or the like which is superficial and renders trapped between the cured assembly and the pipe walls.

FIGS. 5 and 6 show slightly more detail concerning the assembly of the lining and the bag.

As shown in FIG. 6, the main tubular structure 22 provided with the aperture 27 is arranged to have the extension 24 arranged so that collar 26 of extension 24 is located the structure 22 so that the extension tube 24 projects through the aperture 27 as shown in FIG. 6.

Next, the bag 28 is introduced into the inside of the liner and is inflated as shown in FIG. 5 so that the arm 30 in being inflated lies inside the extension tube 24. The bag 28 is now deflated, and the arm 30 is inverted to the position shown in FIG. 4 (and also in FIG. 6) and at the same time the extension tube 24 is also inverted with the arm 30 so that the FIG. 4 (and FIG. 6) condition is reached and the assembly can be placed in the main pipe 10 as shown in FIG. 1.

As mentioned above, inflation when the assembly 20 is appropriately registered with the lateral 12 results in the FIG. 3 position being achieved. FIG. 7 is a sectional view of the lining and bag when in the FIG. 3 position.

The absorbent material of the liner may be any suitable such as fibrous felt material, and it is preferred that ambient cure resin should be used for impregnation of the felt as explained herein. The felt is soaked in the resin in the main tubular structure 22 the extension 24, and the collar 26.

Any suitable inflation medium can be used for inflating the bag 28, and it may be hot or cold. Air or water or both can be used.

The bag 28 preferably is undersize in relation to the felt liner so that when it is deflated it can be readily pulled out.

It can be arranged that flow through of the medium which normally flows in the pipe 10 can be achieved by, for example as shown in FIG. 3, providing that a core tube as shown in dotted lines and illustrated by reference 50 extends through the bag and provides a route for the flow of sewage through the inflated bag. In this case the blocking plug 34 would of course not be used.

It is preferred that a minimum shrinkage resin be utilised and suitable resins are epoxy resins and neopentylglycol.

The lining according to the embodiment is particularly useful for application to the region of where a lateral meets a main pipeline, and it has particular application where a lining pipe has previously been applied along the length of the main pipe and the lateral connection has been re-established, and where the re-establishment of the lateral connection is less than satisfactory. The lining can therefore be applied as a repair to a previous lining operation, or it can of course be applied directly to the existing surfaces for forming an appropriate seal which may indeed, be in advance of a subsequent lining operation.

I claim:

1. A lining for sealing the region of a lateral/main pipe connection, comprising a length of main pipe tubular structure for application to the full circumference of the surface of the main pipe on both sides of the lateral connection pipe, said length of main pipe tubular structure having a wall aperture to be aligned with the lateral pipe, and a lateral extension tubular structure bonded to the main pipe tubular structure at the aperture and extending from said aperture into the lateral pipe, said lateral tubular structure and main pipe tubular structure, each formed of a tubular segment having at least one layer of a resin absorbent material which in use is impregnated with curable synthetic resin.

2. The lining of claim 1, wherein the main pipe tubular structure is formed with said aperture therein and the lateral extension tubular structure includes at one end a collar disposed within the main pipe tubular structure whereby in use the extension tubular structure is fed through the aperture in the main pipe tubular structure so that the collar lies to the inside of the main pipe tubular structure.

3. The lining of claim 2, wherein the collar is formed of resin absorbent material similar to that of the lateral extension tubular structure.

4. An apparatus for installing a lining for sealing the region of a lateral/main pipe connection having a main pipe tubular portion having an aperture to be aligned with the lateral pipe and including at least one layer of resin absorbent material for application to the full circumference of the main pipe on both sides of the lateral opening and having a tubular lateral extension bonded to the main pipe tubular portion at the aperture, comprising an expandable elongated inflation bladder having an inflatable arm portion for inflating the main pipe tubular structure and the extension tubular structure simultaneously.

5. The apparatus of claim 4, wherein the inflation bladder is of a robust inflatable material which has a main elongated inflation portion for positioning inside the main line tubular structure and an inflatable arm portion which lies inside the extension tubular structure when in use.

6. The apparatus of claim 4, wherein the inflation is designed to permit bladder is formed with a longitudinal passageway to allow the flow of liquid along the main pipeline or passageway when the bladder is inflated.

7. The apparatus of claim 6, further including an elongated central core formed so that liquid can pass therethrough and the inflation bladder is mounted on the core.

8. A method of installation of a lining for sealing the region of a lateral/main pipe connection having a main pipe tubular length for application to the full circumference of the main pipe on both sides of the lateral opening including at least one layer of resin absorbent material and having an aperture to be aligned with the lateral pipe and having a tubular lateral extension arm bonded to the main pipe tubular structure at the aperture utilizing an apparatus having an inflation member with a main pipe tubular portion with an aperture and an arm portion bonded to the aperture, comprising deflating the inflation bladder and pushing the arm inwardly to be inverted into the inflation bladder, positioning the inflation bladder inside the main tubular structure which is impregnated with a curable resin, inflating the inflation bladder so that the arm everts into the extension tubular structure impregnating the arm with resin, deflating the bladder (28) inflation is then deflated again, and inverting the arm into the inside of the inflation bladder, along with the extension tubular structure.

9. The method of claim 8, further including, introducing the assembly of the impregnated lining and inflation bladder into a main pipe with a lateral pipe until the inverted arm and extension tubular structure are aligned with the lateral pipe and inflating the inflation bladder which causes the main tubular structure to be inflated against the main pipe (10) on opposite sides of the lateral pipe (12), and the extension tubular structure to be everted into the lateral pipe (12) and against the lateral pipe surface, and maintaining the assembly in this condition while the resin is caused or allowed to cure.

10. The method of claim 9, wherein after curing has been completed, and the lining assumes a rigid condition, the bladder is again deflated and removed from the lining piece which remains in place.

11. The lining of claim 3, wherein the collar is bonded to the inside of the main pipe tubular structure about the aperture.

12. The apparatus of claim 5, wherein the inflatable material is a reinforced silicone rubber.

* * * * *

(12) EX PARTE REEXAMINATION CERTIFICATE (8632nd)
United States Patent
Taylor

(10) Number: US 5,927,341 C1
(45) Certificate Issued: Oct. 25, 2011

(54) LINING OF "TEES" AND "WYES" IN PIPELINES OR PASSAGEWAYS

(75) Inventor: Kevan Charles Taylor, Memphis, TN (US)

(73) Assignee: INA Acquisition Corp., Wilmington, DE (US)

Reexamination Request:
No. 90/009,783, Sep. 13, 2010

Reexamination Certificate for:
Patent No.: 5,927,341
Issued: Jul. 27, 1999
Appl. No.: 08/604,975
Filed: Mar. 25, 1996

(22) PCT Filed: May 9, 1994

(86) PCT No.: PCT/GB94/00995
§ 371 (c)(1),
(2), (4) Date: Mar. 25, 1996

(87) PCT Pub. No.: WO95/08737
PCT Pub. Date: Mar. 30, 1995

(51) Int. Cl.
*F16L 55/16* (2006.01)
*B29C 63/36* (2006.01)

(52) U.S. Cl. .................. 138/98; 138/97; 264/269; 264/516; 156/287

(58) Field of Classification Search .......... 138/98
See application file for complete search history.

(56) References Cited

U.S. PATENT DOCUMENTS

| | | |
|---|---|---|
| 2,789,934 A | 4/1957 | Busbach |
| 3,773,593 A | 11/1973 | Casadevall et al. |
| 4,009,063 A | 2/1977 | Wood |
| 4,064,211 A | 12/1977 | Wood |
| 4,135,958 A | 1/1979 | Wood |
| 4,208,373 A | 6/1980 | Matovich |
| 4,434,115 A | 2/1984 | Chick |
| 4,439,469 A | 3/1984 | Wood |
| 4,484,602 A | 11/1984 | Guthrie |
| 4,496,499 A | 1/1985 | Brittain et al. |
| 4,581,247 A | 4/1986 | Wood |
| 4,582,092 A | 4/1986 | Nissen |
| 4,602,974 A | 7/1986 | Wood et al. |
| 4,680,066 A | 7/1987 | Wood |

(Continued)

FOREIGN PATENT DOCUMENTS

| | | |
|---|---|---|
| AT | 402550 B | 6/1997 |
| CA | 2045689 A1 | 6/1991 |
| DE | 254055 C | 2/1912 |
| DE | 3732694 A1 | 4/1989 |
| DE | 8911917 U1 | 1/1990 |

(Continued)

OTHER PUBLICATIONS

Gelco Grouting Service. Drawing for Alyeska Project. Bates No. LF010077–LF010079. Date on document 1988.
Gelco Grouting Service. Drawing. Bates No. LF010095–LF010096. Date on document Apr. 24, 1989.
Lateral Sealing System, presented by Kevan Taylor at the European Engineers Meeting held on Sep. 27, 1990. Bates No. LF010121–LF010132.

(Continued)

*Primary Examiner* — Joseph A Kaufman

(57) ABSTRACT

The invention provides a tailored assembly of a flexible resin absorbent material (22, 24, 26). It is in the form of a "T" and is of tubular cross section. The arms of the T are intended to lie on the surface of a main underground pipe which the leg of the T extends into a lateral pipe which connects with the main pipe. The whole assembly is soaked in curable synthetic resin and it is placed in position and held there whilst resin cures by means of an inflatable bag (28) which is located inside the assembly and is also tailored to T configuration.

U.S. PATENT DOCUMENTS

| | | | |
|---|---|---|---|
| 4,724,108 A | 2/1988 | Jurgenlohmann et al. |
| 4,728,223 A | 3/1988 | Rice |
| 4,778,553 A | 10/1988 | Wood |
| 4,786,345 A | 11/1988 | Wood |
| 4,887,848 A | 12/1989 | Burba |
| 4,893,389 A | 1/1990 | Allen et al. |
| 4,980,116 A | 12/1990 | Driver |
| 4,991,006 A | 2/1991 | Wood |
| 5,108,533 A | 4/1992 | Long, Jr. et al. |
| 5,167,258 A | 12/1992 | Rice |
| 5,167,901 A | 12/1992 | Driver et al. |
| 5,199,463 A | 4/1993 | Lippiatt |
| 5,223,189 A | 6/1993 | Friedrich |
| 5,329,063 A | 7/1994 | Endoh |
| 5,340,160 A | 8/1994 | Meijers et al. |
| 5,384,086 A | 1/1995 | Smith |
| 5,393,481 A | 2/1995 | Wood |
| 5,439,033 A | 8/1995 | Kamiyama et al. |
| 5,454,401 A | 10/1995 | Kamiyama et al. |
| 5,566,719 A | 10/1996 | Kamiyama et al. |
| 5,598,873 A | 2/1997 | Kamiyama et al. |
| 5,609,439 A | 3/1997 | Schreiner et al. |
| 5,624,629 A | 4/1997 | Wood |
| 5,692,543 A | 12/1997 | Wood |
| 5,915,419 A | 6/1999 | Tweedie et al. |
| 5,927,341 A | 7/1999 | Taylor |
| 5,975,878 A | 11/1999 | Wood et al. |
| 6,029,726 A | 2/2000 | Tweedie et al. |
| 6,068,725 A | 5/2000 | Tweedie et al. |
| 6,227,764 B1 | 5/2001 | Einhaus et al. |
| 6,337,114 B1 | 1/2002 | Wood et al. |
| 6,899,832 B2 | 5/2005 | Wood |

FOREIGN PATENT DOCUMENTS

| | | |
|---|---|---|
| DE | 3929558 A1 | 3/1991 |
| DE | 4031949 A1 | 4/1992 |
| DE | 42 07 037 A1 | 9/1993 |
| DE | 42 07 038 A1 | 9/1993 |
| EP | 0241719 A1 | 10/1987 |
| EP | 0335223 A1 | 10/1989 |
| GB | 1449455 A | 9/1976 |
| GB | 2041147 A | 9/1980 |
| GB | 2082285 A | 3/1982 |
| GB | 2094862 A1 | 9/1982 |
| GB | 2096265 A | 10/1982 |
| GB | 2147966 A | 5/1985 |
| GB | 9009073 | 4/1990 |
| GB | 9319832 | 9/1993 |
| JP | 60120034 A | 6/1985 |
| JP | 60139373 A | 7/1985 |
| JP | 60242038 A | 12/1985 |
| JP | 61290037 A | 12/1986 |
| JP | 62016127 A | 1/1987 |
| JP | 62132632 A | 6/1987 |
| JP | 62135343 A | 6/1987 |
| JP | 62135344 A | 6/1987 |
| JP | 63167193 A | 7/1988 |
| JP | 63254025 A | 10/1988 |
| JP | 63286325 A | 11/1988 |
| JP | 6458525 | 3/1989 |
| JP | 1184122 A | 7/1989 |
| JP | 1188325 A | 7/1989 |
| JP | 1192524 A | 8/1989 |
| JP | 1258938 A | 10/1989 |
| JP | 2103124 A | 4/1990 |
| JP | 2127026 A | 5/1990 |
| JP | 2239920 A | 9/1990 |
| JP | 03067634 A | 3/1991 |
| JP | 3130130 A | 6/1991 |
| JP | 3161320 A | 7/1991 |
| JP | 4355116 A | 12/1992 |
| WO | 8503758 A1 | 8/1985 |
| WO | 8908218 A1 | 9/1989 |
| WO | 9107619 A1 | 5/1991 |
| WO | 9116568 A1 | 10/1991 |
| WO | 9508737 A1 | 3/1995 |

OTHER PUBLICATIONS

Pipeline Infrastructure: Proceedings of the Conference, Sponsored by the Pipeline Division of the American Society of Civil Engineers; Co–sponsored by the Boston Society of Civil Engineers; edited by Bruce A. Bennett. LF010313–LF010319. Boston, MA, Jun. 6–7, 1988.

"Vapor Recovery Repair Project"—video images. Oct. 1985. 2 screen shots. Doc. No. LF010248 and LF010249.

Top Hat Cosmic™ Lateral Connection Sealing System, Brochure, Bates No. AMerik 65–76.

Cosmic–Sondermaschinenbau Ges. M. B. H. DSM–BASF Structural Resins Product Data Palatal P 92 I–02. Product Specifications, Bates No. AMerik 83: May 14, 2001.

Owens Corning, Advantex® Glass Fiber, Website printout: http://www.owenscorner.com/composites/new/table, HTML, Bates No. AMerik 84–85, May 14, 2001.

Owens Corning, Advantex® Galss Fiber, Brochure, Bates No. AMerik 86, May 14, 2001.

Cosmic–Sondermaschinebau, Top Hat™ Lateral Sealing System, Brochure, Bates No. AMerik 183–184.

AMerik Supplies, Inc. Top Hat™ Lateral Sealing System, Brochure, Bates No. AMerik 193–194.

Southwest Pipeline and Trenchless Corp. Top Hat™ and Lateral Lining Installations as of Oct. 2007, Pamphlet, Bates No. AMerik 281–284, Oct. 2007.

Pomer, John, Trenchless Technology Used to Ensure Longevity of Sewer Rehabilitation Project in San Diego, Article, Public Works Department Newsletter, League of California Cities, Sacramento, CA, Winter 2003, Bates No. AMerik 285.

Rush, James, San Diego Utilizes UV–Cured Robotic Lateral Sealing System, Article, Trenchless Technology, Jan. 2002, Bates No. AMerik 286.

Schantz, Dick, Pinetops, N.C., Complete Sewer System Overhaul Article, Trenchless Technology, Nov. 2004, Bates No. AMerik 287–288.

AMerik Supplies, Inc. Top Hat™ Fiberglass Lateral Seal Installation Specifications, Bates No. AMerik 528–529.

Amerik Supplies, Inc. Top Hat™ Lateral Sealing System, Brochure/Photos, Bates No. AMerik 530–532.

Cosmic–Sondermaschinenbau GmbH, Cosmic Drain Renovation & Repair Techniques, Brochure, Bates No. AMerik 533–540.

Trenchless Technology, AMerik Supplies, Brochure Cover, Bates No. SWP 1.

Rush, James, AMerik Supplies: Founded on a Lifetime of Experience, Article, Trenchless Technology, Jan. 2003, www.trenchlessonline.com, Bates No. SWP 2–5.

Nielsen, Erik: Scarrat, Chris, Lateral Sealing and Lining, Presentation Outline, AMerik Supplies, Inc., May 8, 2005, Bates No. SWP 10–15.

Specification for Top Hat™ Lateral Connection Sealing and Repair Product in Relined or Unlined Sewer Main (010505) Outline of Specifications, May 8, 2005, Bates No. SWP 6–9.

Quality Trenchless Technology, Brochure, Bates No. SWP 16.

Cosmic–Sondermaschinenbau GmbH, Top Hat™ Cosmic Lateral Connection Sealing System, Repairs without the need for excavation, Brochure, Bates No. SWP 17–22.

Southwest Pipeline and Trenchless Corp. Top Hat System™ Fiberglass Lateral Seal Installation Specifications; Characteristics of the Top Hat™ Lateral Seal Laminates, Brochure, Bates No. SWP 24–26.

Cosmic: Top Hat Crawler Attachments, Brochure, Bates No. SWP 23.

Southwest Pipeline and Trenchless Corp. Top Hat System™ Lateral Connection Sealing System: the first system in the industry to offer a permanent lateral seal in relined pipelines, Brochure.

Southwest Pipeline and Trenchless Corp. Introduction To The Top Hat System™, Brochure, Bates No. SWP 54–79, Jun. 2001.

Pomer, John, Top Hat Systems Derooting Demo Video & Top Hat, DVD, Southwest Pipeline & Trenchless Corp. Artifact No. 90010358ZA.

Method and Apparatus of Renovating Leaking Walls of Conduits. Specifications and Claims. Bates No. AMerik 185–191.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4 and 8 are determined to be patentable as amended.

Claims 3, 5-7 and 9-12, dependent on an amended claim, are determined to be patentable.

New claims 13-15 are added and determined to be patentable.

1. A lining for sealing the region of a lateral/main pipe connection, comprising a length of main pipe tubular structure for application to the full circumference of the surface of the main pipe on both sides of the lateral connection pipe, said length of main pipe tubular structure having a wall aperture to be aligned with the lateral pipe, and a lateral extension tubular structure bonded to the main pipe tubular structure at the aperture and extending from said aperture into the lateral pipe, said lateral tubular structure and main pipe tubular structure, each formed of a tubular segment having at least one layer of a resin absorbent material which in use is impregnated with curable synthetic resin, *wherein the lateral extension tubular structure includes at one end a collar which overlaps the main pipe tubular structure to provide the lining with increased thickness where the collar overlaps of the main pipe tubular structure.*

2. [The lining of claim 1.] *A lining for sealing the region of a lateral/main pipe connection, comprising a length of main pipe tubular structure for application to the full circumference of the surface of the main pipe on both sides of the lateral connection pipe, said length of main pipe tubular structure having a wall aperture to be aligned with the lateral pipe, and a lateral extension tubular structure bonded to the main pipe tubular structure at the aperture and extending from said aperture into the lateral pipe, said lateral tubular structure and main pipe tubular structure, each formed of a tubular segment having at least one layer of a resin absorbent material which in use is impregnated with curable synthetic resin,* wherein the main pipe tubular structure is formed with said aperture therein and the lateral extension tubular structure includes at one end a collar disposed within the main pipe tubular structure whereby in use the extension tubular structure is fed through the aperture in the main pipe tubular structure so that the collar lies to the inside of the main pipe tubular structure.

4. An apparatus for installing a lining for sealing the region of a lateral/main pipe connection having a main pipe tubular portion having an aperture to be aligned with the lateral pipe and including at least one layer of resin absorbent material for application to the full circumference of the main pipe on both sides of the lateral opening and having a tubular lateral extension bonded to the main pipe tubular portion at the aperture, *wherein the tubular lateral extension includes at one end a collar which overlaps the main pipe tubular portion to provide the lining with increased thickness where the collar overlaps the main pipe tubular portion,* comprising an expandable elongated inflation bladder having an inflatable arm portion for inflating the main pipe tubular structure and the extension tubular structure simultaneously.

8. A method of installation of a lining for sealing the region of a lateral/main pipe connection having a main pipe tubular length for application to the full circumference of the main pipe on both sides of the lateral opening including at least one layer of resin absorbent material and having an aperture to be aligned with the lateral pipe and having a tubular lateral extension arm bonded to the main pipe tubular structure at the aperture utilizing an apparatus having an inflation member with a main pipe tubular portion with an aperture and an arm portion bonded to the aperture, comprising deflating the inflation bladder and pushing the arm inwardly to be inverted into the inflation bladder, positioning the inflation bladder inside the main tubular structure which is impregnated with a curable resin, inflating the inflation bladder so that the arm everts into the extension tubular structure impregnating the arm with resin, deflating the bladder (28) inflation is then deflated again, and inverting the arm into the inside of the inflation bladder, [along with] *at the same time as* the extension tubular structure.

*13. A lining for sealing the region of a lateral/main pipe connection, comprising a length of main pipe tubular structure for application to the full circumference of the surface of the main pipe on both sides of the lateral connection pipe, said length of main pipe tubular structure having a wall aperture to be aligned with the lateral pipe, and a lateral extension tubular structure bonded to the main pipe tubular structure at the aperture and extending from said aperture into the lateral pipe, said lateral tubular structure and main pipe tubular structure, each formed of a tubular segment having at least one layer of a resin absorbent material which in use is impregnated with curable synthetic resin, the lateral extension tubular structure including a collar bonded to the main pipe tubular structure around the aperture.*

*14. The lining of claim 13, wherein the collar abuts an inner surface of the main pipe tubular structure.*

*15. The lining of claim 14, wherein the collar is located at one end of the lateral extension tubular structure.*

* * * * *